(12) United States Patent
Kazmi et al.

(10) Patent No.: US 11,005,639 B2
(45) Date of Patent: May 11, 2021

(54) METHODS AND APPARATUS FOR ASSOCIATING CARRIERS IN A WIRELESS COMMUNICATION NETWORK

(71) Applicant: Telefonaktiebolaget LM Ericsson (publ), Stockholm (SE)

(72) Inventors: Muhammad Kazmi, Sundbyberg (SE); Oscar Ohlsson, Stockholm (SE); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/479,247

(22) PCT Filed: Feb. 6, 2018

(86) PCT No.: PCT/SE2018/050106
§ 371 (c)(1),
(2) Date: Jul. 19, 2019

(87) PCT Pub. No.: WO2018/151642
PCT Pub. Date: Aug. 23, 2018

(65) Prior Publication Data
US 2019/0386807 A1    Dec. 19, 2019

Related U.S. Application Data

(60) Provisional application No. 62/458,854, filed on Feb. 14, 2017.

(51) Int. Cl.
*H04W 4/00*    (2018.01)
*H04L 5/00*    (2006.01)

(52) U.S. Cl.
CPC .......... *H04L 5/0094* (2013.01); *H04L 5/0037* (2013.01); *H04L 5/0078* (2013.01)

(58) Field of Classification Search
CPC .... H04L 5/0094; H04L 5/0037; H04L 5/0078
(Continued)

(56) References Cited

U.S. PATENT DOCUMENTS 10,917,917 B2 *   2/2021   Kazmi ................ H04W 52/146
2012/0147772 A1    6/2012   Kazmi et al.
(Continued)

FOREIGN PATENT DOCUMENTS

| JP | 2007533256 A | 11/2007 |
| JP | 2008546255 A | 12/2008 |
| JP | 2017512438 A | 5/2017 |

OTHER PUBLICATIONS

Unknown, Author, "Enhanced ProSe discovery for intra-PLMN", 3GPP TSG-RAN WG2 #90, R2-152611, Fukuoka, Japan, May 25-29, 2015, pp. 1-5.
(Continued)

*Primary Examiner* — Chuong T Ho
(74) *Attorney, Agent, or Firm* — Christopher & Weisberg, P.A.

(57) ABSTRACT

The present disclosure provides methods and apparatus for associating carriers in a wireless communication network. One embodiments provides a method in a wireless terminal device. The wireless terminal device is configurable with a plurality of carriers for communication with one or more network nodes of a wireless network. The plurality of carriers comprise a first carrier operated by a first network node of the wireless network located at a first cell site. The method comprises: responsive to a determination that a second carrier of the plurality of carriers is operated by the first network node or a second network node of the wireless network that is located at the first cell site: obtaining one or more measured values for one or more radio characteristics for the first carrier; and utilizing the one or more measured
(Continued)

values to transmit a wireless radio message over the second carrier.

15 Claims, 5 Drawing Sheets

(58) Field of Classification Search
 USPC .................................................. 370/329, 330
 See application file for complete search history.

(56) References Cited

U.S. PATENT DOCUMENTS

| | | | |
|---|---|---|---|
| 2014/0126556 A1 | 5/2014 | Tiirola et al. | |
| 2015/0341882 A1* | 11/2015 | Davydov | H04W 36/14 370/336 |
| 2017/0041917 A1 | 2/2017 | Agiwal et al. | |
| 2018/0352590 A1* | 12/2018 | Sha | H04W 72/0453 |
| 2019/0238270 A1* | 8/2019 | Pan | H04B 7/0695 |
| 2019/0364601 A1* | 11/2019 | Kazmi | H04W 16/26 |

OTHER PUBLICATIONS

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.1.0, Dec. 2016, pp. 1-317.

Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0, Mar. 2017, pp. 1-705.

"NRACH Transmission in Enhanced NB-IoT", 3GPP TSG RAN WG4 Meeting #82, R4-1701599, Ericsson, Athens, Greece, Nov. 13-17, 2017, 4 pages.

* cited by examiner

METHODS AND APPARATUS FOR ASSOCIATING CARRIERS IN A WIRELESS COMMUNICATION NETWORK

TECHNICAL FIELD

Embodiments of the present disclosure relate to methods and apparatus in a wireless communication network, and particularly to methods and apparatus for associating carriers in a wireless communication network.

BACKGROUND

The Narrow Band Internet of Things (NB-IOT) is a radio access technology for cellular internet of things (IOT), based to a great extent on a non-backward-compatible variant of Evolved UMTS (Universal Mobile Telecommunications System) Terrestrial Radio Access (E-UTRA). NB-IOT is intended to address various problems, including improved indoor coverage, support for massive numbers of low throughput devices, low delay sensitivity, ultra-low device cost, low device power consumption and (optimized) network architecture.

The NB-IOT carrier bandwidth (Bw2) is 200 KHz. For comparison, examples of operating bandwidth (Bw1) of Long Term Evolution (LTE) are 1.4 MHz, 3 MHz, 5 MHz, 10 MHz, 15 MHz, 20 MHz etc.

NB-IOT supports the following deployment scenarios:

'Stand-alone operation'. In this mode, the NB-IoT system (and particularly communications between a wireless terminal device and a radio access node) utilizes or operates in its own, dedicated spectrum. In such a mode, therefore, NB-IOT communications operate on any carrier frequency which is neither within the carrier of another system nor within the guard band of another system's operating carrier. The other system can itself utilize NB-IOT or any other radio-access technology e.g. LTE. For example, the dedicated spectrum may utilize spectrum currently being used by GERAN systems as a replacement for one or more GSM carriers.

'Guard band operation'. In this mode, the NB-IOT system utilizes or operates in the unused resource blocks within the guard-band of a carrier using a different radio access technology (such as an LTE carrier guard band). The term "guard band" may also interchangeably be called "guard bandwidth". For example, in the case of an LTE bandwidth of 20 MHz (i.e. Bw1=20 MHz or 100 resource blocks), the NB-IOT spectrum can be placed anywhere outside the central 18 MHz but within 20 MHz of the overall LTE bandwidth, i.e. within the 1 MHz bands at the upper and lower edges of the LTE bandwidth.

'In-band operation'. In this mode, the NB-IoT system utilizes or operates in resource blocks within a carrier utilizing a different radio access technology (such as within an LTE carrier). "In-band operation" may also interchangeably be called "in-bandwidth operation". For example, in a LTE bandwidth of 50 RBs (i.e. Bw1=10 MHz or 50 RBs), NB-IOT in-band operation may utilize one resource block (RB) within the 50 RBs.

In NB-IOT, downlink (DL) transmissions are based on orthogonal frequency-division multiplexing (OFDM) with 15 kHz subcarrier spacing and the same symbol and cyclic prefix durations as for legacy LTE (i.e. as defined in Release 13 of LTE standards) for all operational scenarios listed above: standalone, guard-band, and in-band. For uplink (UL) transmission, both multi-tone transmissions (based on a 15 kHz subcarrier spacing on single carrier FDMA) and single tone transmissions (with either 3.75 kHz or 15 kHz subcarrier spacing) are supported.

In NB-IOT, anchor and non-anchor carriers are defined. In a DL anchor carrier, the UE assumes that synchronization signals and system information signals (such as narrowband primary synchronization signal (NPSS), narrowband secondary synchronization signal (NSSS), narrowband physical broadcast channel (NPBCH) and system information blocks for the narrowband (SIB-NB)) are transmitted on the downlink. In a DL non-anchor carrier the UE does not assume that such synchronization signals and system information signals (e.g. NPSS, NSSS, NPBCH and SIB-NB) are transmitted on the downlink. On the anchor carrier, signals are transmitted on a certain subframe or subframes in every frame (e.g. #0, #4, #5) and another certain subframe or subframes (e.g. #9) in every other frame. The anchor carrier subframes transmitting NPBCH/SIB-NB may also contain narrowband reference signals (NRS). The non-anchor carrier contains NRS and UE specific signals such as narrowband physical downlink control channel (NPDCCH) and narrowband physical downlink shared channel (NPDSCH).

Resources for the non-anchor carrier are configured by the network node (e.g. a radio access node such as an eNB or similar). For example, the eNB may signal a bitmap of DL subframes using information elements (DL-Bitmap-NB) which are treated as a non-anchor carrier. The anchor carrier and/or non-anchor carrier may typically be operated or served by the same network node e.g. by the serving cell. But the anchor carrier and/or non-anchor carrier may also be operated or served by different network nodes. The configuration of the non-anchor carriers may be sent via dedicated signaling to the UE or broadcasted in the cell in System Information. The latter option may be used when the non-anchor carrier is to be used in idle mode, e.g. for paging and random access. An example of how the broadcasted non-anchor configuration can look like is shown below. Note that the details of the configuration (e.g. parameter names, mandatory/optional parameters, etc) are still being discussed in 3GPP and parts of the carrier configuration in the example below may therefore still change.

SystemInformationBlockTypeX-NB

The IE SystemInformationBlockTypeX-NB contains radio resource configuration for paging and random access procedure on non-anchor carriers.

| SystemInformationBlockTypeX-NB information element |
|---|
| -- ASN1START<br>SystemInformationBlockTypeX-NB-r14 ::= SEQUENCE {<br>    dl-CarrierConfigList-r14    DL-CarrierConfigCommonList-NB-r14    OPTIONAL,  -- Need OR<br>    ul-CarrierConfigList-r14    UL-CarrierConfigCommonList-NB-r14    OPTIONAL,  -- Need OR<br>    <cut> |

| SystemInformationBlockTypeX-NB information element |  |
|---|---|
| ... }<br>DL-CarrierConfigCommonList-NB-r14 ::=<br>r14)) OF<br><br>UL-CarrierConfigCommonList-NB-r14 ::=<br>r14)) OF<br><cut><br>-- ASN1STOP | SEQUENCE (SIZE (1.. maxNonAnchorCarriers-NB-<br><br>DL-CarrierConfigCommon-NB-r14<br>SEQUENCE (SIZE (1.. maxNonAnchorCarriers-NB-<br><br>UL-CarrierConfigCommon-NB-r14 |

The random access procedure may be used for one or more purposes, e.g. initial access (particularly for UEs in the RRC_IDLE state), accessing resources for initiating a UE- or network-originated call, resynchronization of UL transmissions, scheduling request, positioning etc. In NB-IoT, random access messages may be transmitted by the UE on the anchor carrier or a non-anchor carrier. The physical random access channel (PRACH) for NB-IoT is called narrowband PRACH (NPRACH).

The resources available for NPRACH transmission may be provided to the UE in the NB-IoT system information blocks e.g. in system information block 2-NB (SIB2-NB) or in a dedicated channel via radio resource control (RRC). The resources may comprise one or more of: a random access preamble (e.g. time and frequency resources), NPRACH starting time, NPRACH resource periodicity etc. Examples of time—frequency resources are subcarriers, subframes etc. The UE may also acquire additional parameters such as the number of repetitions per NPRACH preamble transmission, maximum the number of NPRACH attempts etc.

The UE can perform only contention based random access according to the latest versions of the NB-IOT standards defined in in Rel-14. However, non-contention based random access may be allowed in future. A non-contention based random access or contention free random access can be initiated by the network node e.g. eNodeB. The eNodeB may initiate a non-contention based random access either by sending a message in a DL control channel or by indicating it in an RRC message. The eNodeB can also instruct the UE to perform a contention based random access.

In order to select appropriate random access resources, the UE may determine the coverage level associated with the carrier on which the random access transmission is to be made, also interchangeably referred to as the coverage enhancement (CE) level. For example, for a transmission on the anchor carrier, the UE may determine the CE level based on a path loss (PL) estimated between the UE and the network node operating the anchor carrier. The PL in turn is based on a measurement of the signal received over the anchor carrier (e.g. the narrowband received signal received power, NRSRP), e.g. PL=$P_{NRS}$-NRSRP [dB]; where $P_{NRS}$ is the transmit power of the narrow band reference signal (NRS), which is used by the UE for measuring NRSRP. The parameter, $P_{NRS}$, may be signaled to the UE by the network node.

SUMMARY

It has been suggested that the random access procedure set out above can be simplified by the UE performing measurements (e.g. determining path loss, NRSRP, etc) only on the anchor carrier. These measurements can then be reused for transmissions on non-anchor carriers. However, a problem with this approach is that measurements on the anchor carrier may not accurately reflect measurements on a non-anchor carrier.

Embodiments of the disclosure provide methods and apparatus, such as wireless terminal devices and network nodes (e.g. eNodeBs or gNodeBs, or servers coupled to such nodes), that alleviate one of more of the problems identified above.

In one aspect, there is provided a method in a wireless terminal device. The wireless terminal device is configurable with a plurality of carriers for communication with one or more network nodes of a wireless network. The plurality of carriers comprise a first carrier operated by a first network node of the wireless network located at a first cell site. The method comprises: responsive to a determination that a second carrier of the plurality of carriers is operated by the first network node or a second network node of the wireless network that is located at the first cell site: obtaining one or more measured values for one or more radio characteristics for the first carrier; and utilizing the one or more measured values to transmit a wireless radio message over the second carrier.

Aspects of the disclosure also provide apparatus for performing the method set out above. For example, in one aspect, there is provided a wireless terminal device configurable with a plurality of carriers for communication with one or more network nodes of a wireless network. The plurality of carriers comprise a first carrier operated by a first network node of the wireless network located at a first cell site. The wireless terminal device comprises processing circuitry and a non-transitory machine-readable medium storing code which, when executed by the processing circuitry, causes the wireless terminal device to: responsive to a determination that a second carrier of the plurality of carriers is operated by the first network node or a second network node of the wireless network that is located at the first cell site: obtain one or more measured values for one or more radio characteristics for the first carrier; and utilize the one or more measured values to transmit a wireless radio message over the second carrier.

Another aspect provides a wireless terminal device configurable with a plurality of carriers for communication with one or more network nodes of a wireless network. The plurality of carriers comprise a first carrier operated by a first network node of the wireless network located at a first cell site. The wireless terminal device comprises: a first module configured to, responsive to a determination that a second carrier of the plurality of carriers is operated by the first network node or a second network node of the wireless network that is located at the first cell site, obtain one or more measured values for one or more radio characteristics for the first carrier; and a second module configured to utilize the one or more measured values to transmit a wireless radio message over the second carrier.

In another aspect, there is provided a method in a network node for a wireless network, wherein a wireless terminal device is configurable with a plurality of carriers for communication with the wireless network. The plurality of carriers comprise a first carrier, operated by a first network node located at a first cell site, and a second carrier. The method comprises: transmitting, to the wireless terminal device, configuration information indicating that the second carrier is operated by the first network node or by a second network node that is located at the first cell site.

Aspects of the disclosure also provide apparatus for performing the method set out above. For example, in one aspect, there is provided a network node for a wireless network. A wireless terminal device is configurable with a plurality of carriers for communication with the wireless network. The plurality of carriers comprise a first carrier, operated by a first network node located at a first cell site, and a second carrier. The network node comprises processing circuitry and a non-transitory machine-readable medium storing code which, when executed by the processing circuitry, causes the network node to: transmit, to the wireless terminal device, configuration information indicating that the second carrier is operated by the first network node or by a second network node that is located at the first cell site.

In another aspect, there is provided a network node for a wireless network. A wireless terminal device is configurable with a plurality of carriers for communication with the wireless network. The plurality of carriers comprise a first carrier, operated by a first network node located at a first cell site, and a second carrier. The network node comprises: a first module configured to transmit, to the wireless terminal device, configuration information indicating that the second carrier is operated by the first network node or by a second network node that is located at the first cell site.

Further embodiments of the disclosure are set out below. In one embodiment, a network node associates an anchor carrier (C1) with at least one non-anchor carrier (C2) based on at least a condition that C1 and C2 are operated (or served or managed) by the same network node or by network nodes that are located in the same site (aka co-located nodes, co-sited nodes), and configures a wireless terminal with information about C1 and C2 provided they are co-located. The information about the association between C1 and C2 based on the co-location of nodes (or served by the same node) can be pre-defined or signaled to the wireless terminal.

In another embodiment, a wireless terminal obtains information about an anchor carrier (C1) and at least one non-anchor carrier (C2). The wireless terminal uses measurement performed on C1 to carry out operations (e.g. NRACH transmission) on C2 provided that C1 and C2 are operated by the same network node or are operated by co-located network nodes. If C1 and C2 are not operated by the same network node or not operated by co-located network nodes, then the wireless terminal may use measurements carried out on C2 to perform the operation (e.g. NRACH transmission) on C2.

According to embodiments of the disclosure, the relation between anchor carrier and non-anchor carrier in terms of location of their network nodes is well defined. This enables the wireless terminal to apply appropriate measurement for CE level selection and for resource selection for random access to the non-anchor carrier.

The method enables the wireless terminal to accurately perform random access on a non-anchor carrier while reusing the measurement done on anchor carrier when anchor and non-anchor carriers are operated by the same network node or different but co-located network nodes. This in turn reduces wireless terminal processing, power consumption and complexity.

The method enables the wireless terminal to perform measurement on non-anchor carriers only when necessary i.e. when anchor carrier and non-anchor carrier are operated by non co-located nodes.

Note that the discussion below focuses on a technical solution for NB-IOT; however, those skilled in the art will appreciate that it is also possible to apply the methods and apparatus described herein to other networks and access technologies, such as LTE and those networks intended to meet the requirements set out for the fifth generation (5G) of wireless systems, as defined by the Next Generation Mobile Networks Alliance. In other networks, nodes and interfaces may have different names (e.g. gNB instead of eNB, or XN interface instead of X2 interface).

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

Figure 1:
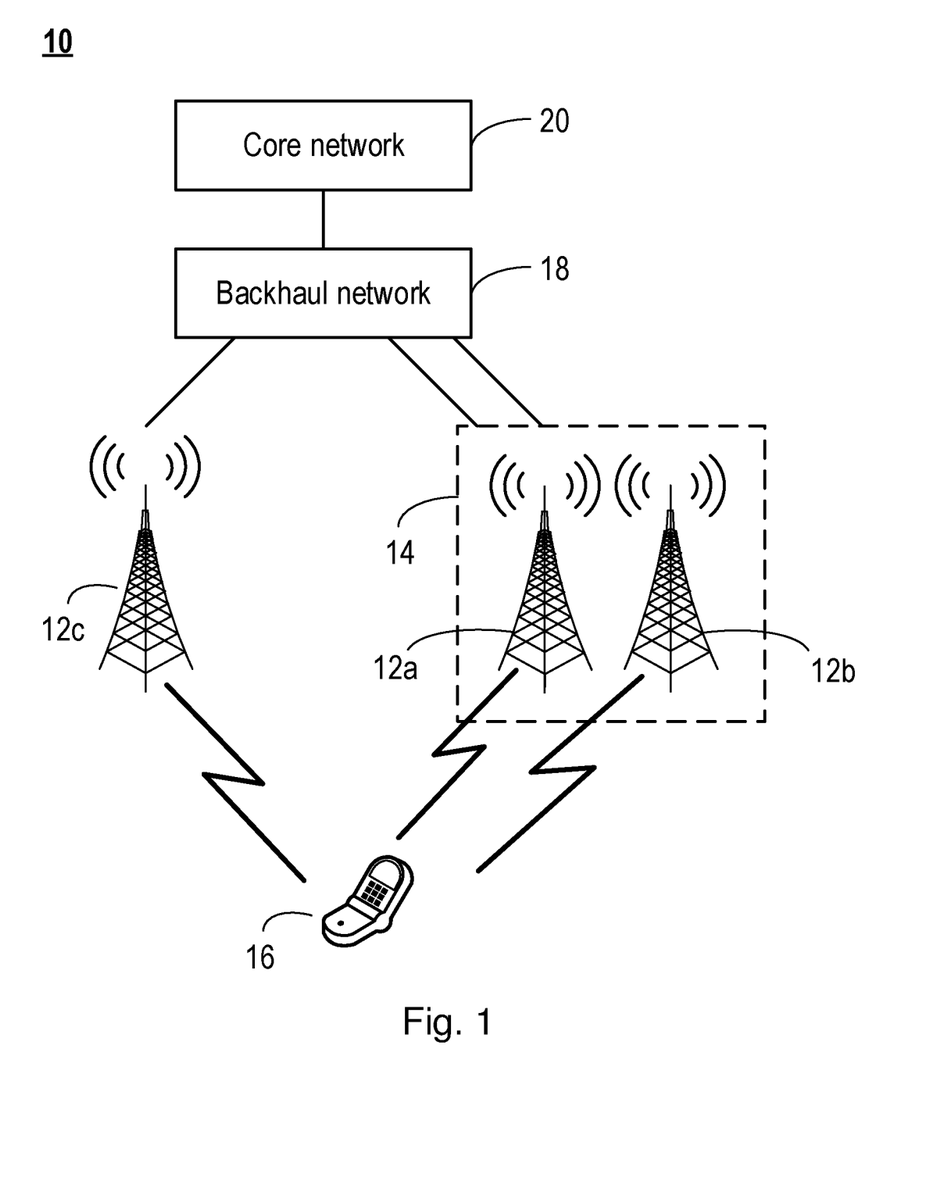
FIG. 1 shows a wireless communications network.

FIG. 1 shows a network 10 that may be utilized to explain the principles of embodiments of the present disclosure. The network 10 comprises first, second and third radio access nodes 12a, 12b, 12c (collectively, radio access nodes 12) which are connected, via a backhaul network 18, to a core network 20.

The first and second radio access nodes 12a, 12b are located on the same cell site 14, while the third radio access node 12c is located at a different site. In the following, the first and second radio access nodes 12a, 12b may be termed "co-located", in that they occupy or are located at the same cell site, whereas the third radio access node 12c is non co-located with the first and second radio access nodes 12a, 12b. Radio access nodes may be deemed "co-located" if they are separated by a distance that is less than a threshold distance. For example, the wireless terminal 16 may determine that the first and second radio access nodes 12a, 12b are co-located based on the respective distances L1 and L2 between the wireless terminal 16 and the respective radio access nodes 12a, 12b. If L1=L2, or if |L1-L2|≤H, where H is the distance threshold, the radio access nodes 12a, 12b may be deemed co-located. Additionally or alternatively, the wireless terminal 16 may determine that the first and second radio access nodes 12a, 12b are co-located based on the calculated respective path losses between the radio access nodes 12a, 12b and the wireless terminal 16. The first and second radio access nodes 12a, 12b may be deemed co-located if the path loss (PL1) between the wireless terminal 16 and the first radio access node 12a is the same as the path loss (PL2) between the wireless terminal 16 and the second radio access node 12b, i.e. PL1=PL2 or PL1 and PL2 are very similar or in the same range, for example, |PL1-PL2|≤G, where G is PL margin or PL threshold.

Correspondingly, the first and third radio access nodes 12a, 12c may be deemed non co-located based on the respective distances L1 and L3 between the wireless terminal 16 and the respective radio access nodes 12a, 12c. If L1≠L3, or if |L1-L3|>H, where H is the distance threshold, the radio access nodes 12a, 12c may be deemed non co-located. Additionally or alternatively, the wireless terminal 16 may determine that the first and third radio access nodes 12a, 12c are non co-located based on the calculated respective path losses between the radio access nodes 12a, 12c and the wireless terminal 16. The first and third radio access nodes 12a, 12c may be deemed non co-located if the path loss (PL1) between the wireless terminal 16 and the first radio access node 12a is not the same as the path loss (PL3) between the wireless terminal 16 and the third radio access node 12c, i.e. PL1≠PL3 or |PL1-PL3|>G, where G is the PL margin or PL threshold.

The radio access nodes 12 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

A wireless terminal 16 (see above for alternative terminology) is configurable to establish one or more radio carriers with the radio access nodes 12. For example, the wireless terminal 16 may be camped on a cell which one of the radio access nodes 12 serves. Messages transmitted by the wireless terminal 16 to a radio access node 12 are said to be transmitted in the "uplink", while messages transmitted by the radio access node 12 to the wireless terminal 16 are said to be transmitted in the "downlink".

The wireless terminal 16 is configurable to communicate with the network 10 via a plurality of carriers. The plurality of carriers comprises at least one anchor carrier and at least one non-anchor carrier. The plurality of carriers may be operated by one or more of the radio access nodes 12, and thus the wireless terminal 16 may communicate wirelessly with one or more network nodes at the same time. For example, if the wireless terminal 16 has a first (anchor) carrier established with the first radio access node 12a, a second (non-anchor) carrier may be established between the wireless terminal 16 and the first radio access node 12a (i.e. more than one carrier is established with the same network node), the second radio access node 12b, or the third radio access node 12c. Further carriers may also be established.

The term "operated" is taken herein to mean transmitting and/or receiving radio signals on a particular carrier. Thus a carrier which is operated by the first radio access node 12a, for example, may be used for transmitting signals from the first radio access node 12a to the wireless terminal 16 (i.e. downlink), receiving signals at the first radio access node 12a from the wireless terminal 16 (i.e. uplink), or both uplink and downlink transmissions. For example, a carrier may be used for transmitting as well as receiving signals in different time resources, e.g. when configured as a time division duplex (TDD) carrier. In another example, a carrier may further comprise first and second sub-carriers having different frequencies, where the first sub-carrier is used by the radio access node for transmitting signals (i.e. DL signals) and the second sub-carrier is used for receiving signals (i.e. UL signals).

The wireless terminal may operate under either normal coverage or enhanced coverage with respect to a serving cell. The enhanced coverage is also interchangeably called extended coverage. The wireless terminal may also operate in a plurality of coverage levels (CE) e.g. normal coverage (aka CE level 0), enhanced coverage level 1 (CE1), enhanced coverage level 2 (CE2), enhanced coverage level 3 (CE3) and so on.

The normal and extended coverage operations may typically take place on narrower UE RF bandwidth compared to the overall system bandwidth (also known as cell bandwidth, cell transmission bandwidth, DL system bandwidth etc). In some embodiments the UE RF bandwidth can be the same as of the system bandwidth. Examples of narrow RF bandwidths are 200 KHz, 1.4 MHz etc. Examples of system bandwidths are 200 KHz, 1.4 MHz, 3 MHz, 5 MHz, 10, MHz, 15 MHz, 20 MHz etc. In the case of extended/enhanced coverage, the wireless terminal may be capable of operating under lower signal quality level (e.g. SNR, SINR, ratio of average received signal energy per subcarrier to total received power per subcarrier (Ês/Iot)), RSRQ etc) compared to its capabilities when operating in legacy systems. The coverage level enhancement may vary with the operational scenario and may also depend on the wireless terminal type. For example, a wireless terminal which is located in a basement with bad coverage may need larger level of coverage enhancement (e.g. 20 dB) compared to a wireless terminal which is at a cell border (e.g. −3 dB).

The coverage level of the wireless terminal may be defined with respect to any cell e.g. serving cell, non-serving cell, neighbour cell etc. The coverage level is also interchangeably called as the coverage enhancement (CE) level. For example the CE level with respect to a cell can be expressed in terms of signal level received at the UE from that cell. Alternatively, the CE level of the wireless terminal with respect to a cell can be expressed in terms of signal level received at the cell from the wireless terminal. As an example received signal level can be expressed in terms of received signal quality and/or received signal strength at the wireless terminal with respect to the cell. More specifically the coverage level may be expressed in terms of:

received signal quality and/or received signal strength at the wireless terminal with respect to a cell and/or received signal quality and/or received signal strength at the cell with respect to the wireless terminal.

The CE level may be expressed in terms of two or more discrete levels or values e.g. CE level 1, CE level 2, CE level 3 etc, with measured values for the signal quality, or signal strength, for example, mapping to one or more of the discrete levels or values. Consider an example of two coverage levels defined with respect to signal quality (e.g. SNR) at the wireless terminal, comprising:

Coverage enhancement level 1 (CE1) in which SNR≥−6 dB at the wireless terminal with respect to a cell; and Coverage enhancement level 2 (CE2) in which −15 dB≤SNR<−6 dB at the wireless terminal with respect to a cell.

In the above example the CE1 may also be interchangeably called as normal coverage level, baseline coverage level, reference coverage level, legacy coverage level etc. CE2 may be termed as enhanced coverage or extended coverage level.

In another example two different coverage levels (e.g. normal coverage and enhanced coverage) may be defined in terms of signal quality levels as follows:

The requirements for normal coverage are applicable for the UE category NB1 with respect to to a cell provided that radio conditions of the UE with respect to that cell are defined as follows SCH Ês/Iot≥−6 dB and cell reference signal (CRS) Ês/Iot≥−6 dB.

The requirements for enhanced coverage are applicable for the UE category NB1 with respect to to a cell provided that radio conditions of the UE with respect to that cell are defined as follows SCH Ês/Iot≥−15 dB and CRS Ês/Iot≥−15 dB.

Thus, in general, the CE level for a particular cell or carrier may be defined by a mapping between discrete levels or values for the CE level and one or more measures of the signal quality or signal strength over that particular cell.

Figure 2:
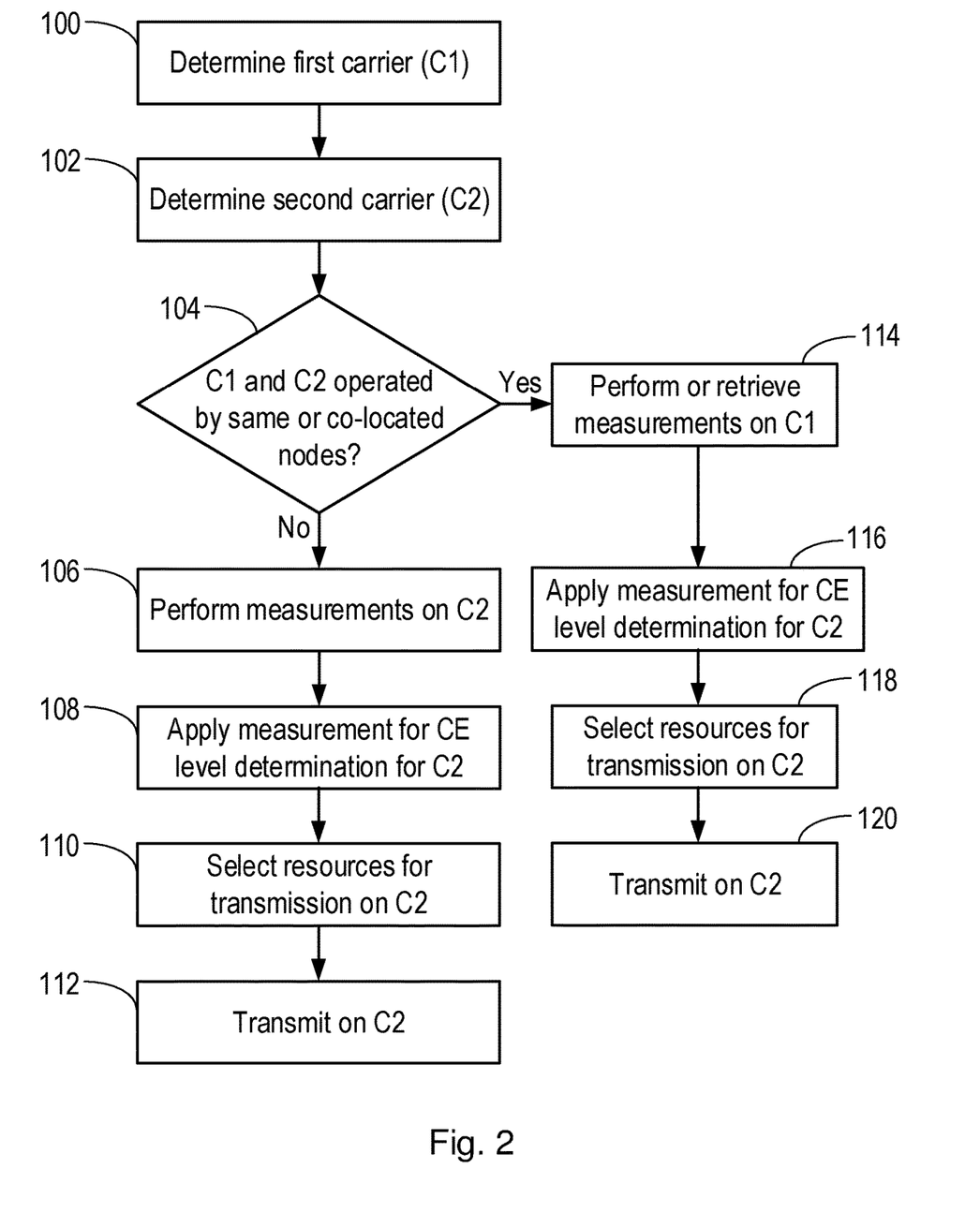
FIG. 2 is a flowchart of a method in a wireless terminal device according to embodiments of the disclosure.

FIG. 2 is a flowchart of a method in accordance with some embodiments of the disclosure. The method may be carried out by a terminal device, for example, such as the wireless terminal 16 described above with respect to FIG. 1, and used for transmitting a message over a second carrier C2, which may be a non-anchor carrier. The transmitted message may be any message, such as a data channel message; a control channel message; or a random-access channel message.

The disclosed embodiments are applicable for a wireless terminal in a low or high activity state (such as low or high RRC states). Examples of low activity states include RRC idle state, idle mode etc. Examples of high activity states are RRC CONNECTED state, active mode, active state etc. The terminal device may be configured to operate in discontinuous reception (DRX) mode or in non-DRX mode. If configured to operate in DRX, the wireless terminal may still operate according to non-DRX as long as it receives new transmissions from the network node.

The method begins in step 100, in which the wireless terminal determines a first carrier C1. In one embodiment, the first carrier C1 is an anchor carrier.

Step 100 may comprise the sub-steps of the wireless terminal obtaining information about the first carrier C1. For example, the wireless terminal may obtain such information by receiving one or more messages from a network node (e.g. a serving radio access node). The messages may be transmitted using RRC signalling or other protocols. The messages may be broadcast (e.g. as part of a system information block), or dedicated to the wireless terminal (e.g. unicast or multicast). The information acquired may comprise one or more of: an indication of the carrier frequency associated with the first carrier C1 (e.g. channel number, absolute radio frequency channel number, ARFCN, E-UTRA absolute radio frequency channel number EARFCN, etc); and an indication of an association between the first carrier and one or more other carriers, or an indication of a deployment mode of the first carrier C1. The information may further comprise an indication that the carrier C1 is configured as an anchor carrier for the wireless terminal.

The method proceeds to step 102, in which the wireless terminal determines a second carrier C2. In one embodiment, the second carrier C2 is a non-anchor carrier.

Step 102 may comprise the sub-steps of the wireless terminal obtaining information about the second carrier C2. For example, the wireless terminal may obtain such information by receiving one or more messages from a network node (e.g. a serving radio access node). The messages may be transmitted using RRC signalling or other protocols. The messages may be broadcast (e.g. as part of a system information block), or dedicated to the wireless terminal (e.g. unicast or multicast). The information acquired may comprise one or more of: an indication of the carrier frequency associated with the second carrier C2 (e.g. channel number, absolute radio frequency channel number, ARFCN, E-UTRA absolute radio frequency channel number EARFCN, etc); and an indication of an association between the second carrier and one or more other carriers, or an indication of a deployment mode of the second carrier C2. The information may further comprise an indication that the second carrier C2 is configured as a non-anchor carrier for the wireless terminal.

The wireless terminal may further obtain information about the operational mode used for operating carriers C1 and C2. As noted above, examples of operational modes are in-band, standalone and guard band. For example the wireless terminal may obtain this information by receiving it from a network node (e.g. the nodes operating the carriers) or based on pre-defined rule.

The method proceeds to step 104, in which the wireless terminal determines whether the carriers C1 and C2 are operated by the same network nodes, or by co-located network nodes. Using the example of FIG. 1, for instance, step 104 may be answered in the positive if the first carrier C1 is operated by the first radio access node 12a and the second carrier C2 is operated by either the first radio access node 12a or the second radio access node 12b. Step 104 may be answered in the negative if the first carrier C1 is operated by the first radio access node 12a or the second radio access node 12b and the second carrier C2 is operated by the third radio access node 12c (or vice versa).

The wireless terminal may determine that the first and second carriers are operated by the same or co-located network nodes based on any association between the carriers C1, C2 received in the signalling described in steps 100 and 102. For example, the configuration information for the carriers C1, C2 may indicate an association between the two carriers that indicates the carriers are operated by the same network node or co-located network nodes. Additionally or alternatively, the wireless terminal may determine that the first and second carriers are operated by the same or co-located network nodes based on an indication of the deployment mode of the first and second carriers, determined in steps 100 and 102. For example, in a first deployment mode, the first and second carriers may be deemed to be operated by the same network node or co-located network nodes; in a second deployment mode, the first and second carriers may be deemed to be operated by non co-located network nodes.

The association or deployment mode may be determined explicitly or implicitly. In the former case, the association between carriers or the deployment mode can be explicitly signalled to the wireless terminal in the messages described above with respect to steps 100 and 102. In the latter case, the association between carriers or the deployment mode may be implicitly determined by the wireless terminal based on one or more other factors. For example, if both carriers are operating in the same operational mode (e.g. both carriers utilize in-band operation, or both carriers utilize guard-band operation, or both carriers utilize standalone operation), it may be pre-defined that the wireless terminal is to assume an association between the carriers, or to assume a deployment mode for the two carriers that indicates they are both operated by the same network node or co-located network nodes. In further embodiments, the wireless terminal may utilize historical data or statistics to determine whether there is any association between carriers C1 and C2, or whether a particular deployment mode should be assumed. For example, the wireless terminal may determine that the carriers are operated by the same network node or co-located network nodes based on measurements over the first and second carriers C1, C2. In one embodiment, the wireless terminal may calculate the path loss on each carrier, and determine that the path losses are the same or different, or within a threshold of each other or not, and so determine that the carriers are operated by the same network node or co-located network nodes, or by non co-located network nodes. The historical data may comprise an indication as to whether the first and second carriers have previously been associated with each other, or operated under a particular deployment mode (in which the case the same association or deployment mode may be assumed).

According to embodiments of the disclosure, the determination made in step 104 may be used to alter the measurement process in the wireless terminal. Thus, if the determination in step 104 is that the first and second carriers are operated by non co-located network nodes, the method proceeds to step 106 in which the wireless terminal performs measurements on the second carrier C2.

According to this procedure, the wireless terminal performs one or more measurements on the second carrier C2 (i.e. on radio signals of C2) in order to obtain one or more measured values for one or more radio characteristics of the second carrier. The measurements may be performed on one or more reference signals in the second carrier C2, such as narrowband reference signals (NRS).

The radio characteristics may comprise one or more of: radio signal strength (e.g. path loss, path gain, received signal received power (RSRP), narrowband RSRP (NRSRP), SCH_RP etc), and radio signal quality (e.g. signal-to-noise ratio (SNR), signal-to-noise-and-interference ratio (SINR), channel quality indicator (CQI), received signal received quality (RSRQ), narrowband RSRQ (NRSRQ), cell reference signal (CRS) Ês/Iot, single channel (SCH) Ês/Iot etc). The notation Ês/Iot is defined as the ratio of Ês, which is the received energy per resource element RE (power normalized to the subcarrier spacing) during the useful part of the symbol, i.e. excluding the cyclic prefix, at the UE antenna connector, to Iot which is the received power spectral density of the total noise and interference for a certain RE (power integrated over the RE and normalized to the subcarrier spacing) as measured at the UE antenna connector In step 108, the wireless terminal applies the measurements obtained in step 106 in order to determine the coverage enhancement (CE) level, also known as the coverage level (see above).

Step 108 may comprise the wireless terminal further estimating a path loss (PL) between the wireless terminal and the network node operating carrier C2, based on the results of the measurement, and using the PL for determining the CE level with respect to carrier C2. In alternative embodiments, the wireless terminal may determine the CE level for carrier C2 based directly on the measurements obtained in step 106. See the discussion above concerning the mapping between CE levels and measured values for the signal quality and/or signal strength.

In step 110, the wireless terminal selects radio resources related to C2 based on the determined CE level. Radio resources may comprise one or more of: time resources (e.g. time slots, subframes, repetition rate, number of repetitions, etc), frequency resources (e.g. subchannel(s)), and orthogonal codes for encoding the transmission. The wireless terminal may also acquire additional parameters such as the number of repetitions per transmission attempt, the maximum number of transmission attempts, the transmit power level(s), etc.

In step 112, the wireless terminal uses the selected resources to transmit a message over carrier C2. As noted above, the message may comprise one or more of: a data message; a control message; and a random access message.

If the determination in step 104 is that the first and second carriers are operated by the same network node or by co-located network nodes, the method proceeds to step 114 in which the wireless terminal obtains measurements for the first carrier C1. As the two carriers are transmitted from the same network node, or by network nodes that are located close to each other, it can be assumed that the measurements for one carrier apply also to the other carrier. Thus, in this situation, the wireless terminal can perform measurements on only one carrier, and apply those measurements to other carriers operated by the same network node or by co-located nodes.

Thus, in step 114 the wireless terminal obtains one or more measured values for one or more radio characteristics of the first carrier C1. Step 114 may comprise the wireless terminal performing measurements on the first carrier C1 (i.e. on radio signals such as NRS). Alternatively, step 114 may comprise the wireless terminal retrieving from a memory accessible to the terminal (e.g. its own memory) one or more measured values that relate to a previous measurement performed by the wireless terminal. For example, the wireless terminal may carry out such measurements at regular or periodic intervals on the anchor carrier, in which case the wireless terminal may obtain the one or more measured values that relate to a most-recent measurement.

As with step 106, the radio characteristics may comprise one or more of: radio signal strength (e.g. path loss, path gain, received signal received power (RSRP), narrowband RSRP (NRSRP), SCH_RP etc), and radio signal quality (e.g. signal-to-noise ratio (SNR), signal-to-noise-and-interference ratio (SINR), channel quality indicator (CQI), received signal received quality (RSRQ), narrowband RSRQ (NRSRQ), cell reference signal (CRS) Ês/Iot, single channel (SCH) Ês/Iot etc). The notation Ês/Iot is defined as the ratio of Ês, which is the received energy per resource element RE (power normalized to the subcarrier spacing) during the useful part of the symbol, i.e. excluding the cyclic prefix, at the UE antenna connector, to Iot which is the received power spectral density of the total noise and interference for a certain RE (power integrated over the RE and normalized to the subcarrier spacing) as measured at the UE antenna connector The method proceeds to step 116, which is substantially similar to step 108, except that the wireless terminal determines the CE level for carrier C2 based on the measurements obtained in step 114, i.e. for the first carrier C1.

In step 118, the wireless terminal selects resources for the transmission of the message on carrier C2, and in step 120 the wireless terminal transmits the message using the selected resources. In some embodiments, these steps are substantially the same as steps 110 and 112, respectively.

However, in other embodiments step 118 in that information about the relations of the DL transmission power of C1 and C2 can also be provided to the wireless terminal, e.g., via system information or dedicated messages. The DL transmission power can also be derived indirectly, e.g., from other configurations such as the number of repetitions used by paging, or the power difference between reference signals. A wireless terminal can use such information to further determine which UL carrier should be used to transmit its message. This is because for an UL carrier, there is an associated DL carrier for the random access response, and the UL may try to use this additional information, together with its own measurements, to determine a preferred DL carrier.

In the illustrated embodiment the measurements are performed on the anchor carrier and applied to non-anchor carriers. This embodiment has the advantage that the wireless terminal may already carry out measurements on the anchor carrier in order to execute other procedures, such as mobility procedures related to cell-handover. Thus, in this embodiment, the wireless terminal may be able to transmit messages without performing any new measurements, instead relying on measurements previously carried out on the anchor carrier C1. However, in other embodiments the measurements may be performed on a non-anchor carrier and applied to other carriers such as the anchor carrier.

Figure 3:
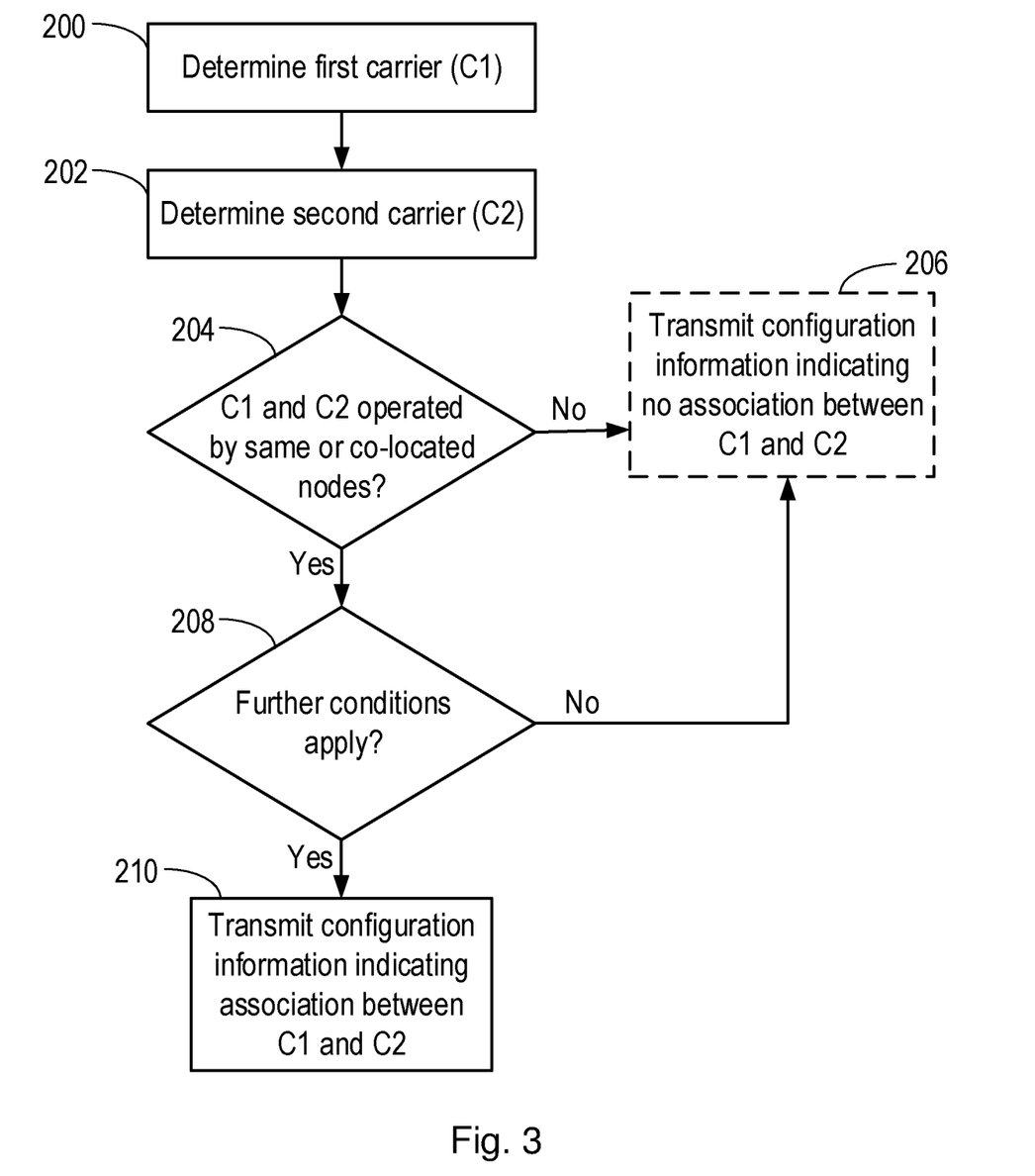
FIG. 3 is a flowchart of a method in a network node according to embodiments of the disclosure.

FIG. 3 is a flowchart of a method in accordance with embodiments of the disclosure. The method may be carried out in a network node, such as a radio access node, e.g. the radio access nodes 12. In one embodiment, the method is performed by the network node operating the anchor carrier.

In step 200 the network node determines at least one carrier frequency which can be used as a first carrier (C1). In one embodiment, the first carrier C1 is an anchor carrier. For example a carrier which transmits certain type of common signals in the downlink may be used as anchor carrier e.g. NPSS, NSSS, NPBCH, SIB-NB etc.

The network node may further determine C1 based on its frequency characteristics e.g. carrier frequency, frequency band etc. For example carrier frequency or carrier in frequency band below 1 GHz may be used as C1.

The network node may further determine C1 based on the maximum available transmit power in the downlink. For example carrier frequency on which the network node can transmit at least X dBm (e.g. 30 dBm) may be used as C1.

The determined carrier, C1, is operated by a first network node (NW1), which in one embodiment is the network node carrying out the method.

In step 202, the network node determines at least one carrier frequency for a second carrier (C2). In one embodiment, the second carrier is a non-anchor carrier. The carrier, C2, is operated by a second network node (NW2) (which may be the same as the first network node NW1).

In step 204, the network node determines whether the first and second carriers are operated by the same network node or by network nodes that co-located (as defined above).

For example, if the method is carried out by the first network node, and both carriers are operated by the first network node, this determination can easily be made upon the establishment of first and second carriers operated by the first network node. Alternatively, the first network node may be able to determine, through direct signalling with the second network node or sensing of signals transmitted by the second network node, that the second network node is co-located with the first network node.

Alternatively, the network node may determine whether the nodes operating C1 and C2 are the same or co-located based on one or more of the following:

Based on pre-defined information e.g. information about carrier frequencies and the location information of network nodes operating their respective carriers, Information received from another network node, Historical data or statistics of deployment mode used for operating C1 and C2, i.e. if carriers C1 and C2 have previously been associated together based on their operation by the same network node or by co-located nodes, the same association may be assumed in step 204.

In one embodiment, step 204 is optional or implicit, in that the method may only be carried out responsive to a determination that the first and second carriers are operated by the same network node or by co-located nodes.

If the first and second carriers are not operated by the same network node or by co-located network nodes, in one embodiment the method ends. Thus no configuration information is transmitted to a wireless terminal to indicate whether or not the carriers are associated with each other, or have the same deployment mode. In such embodiments, the wireless terminal may assume that no association or common deployment mode exists.

Alternatively, the method may proceed to step 206, in which the network node transmits configuration information to a wireless terminal indicating explicitly or implicitly that no association or common deployment mode exists between carriers C1 and C2. The configuration information may be transmitted in one or more than one message. The configuration information may be transmitted using RRC signalling or other protocols. The configuration information may be broadcast (e.g. as part of a system information block), or dedicated to the wireless terminal (e.g. unicast or multicast). The configuration information may comprise one or more of: an indication of the carrier frequency associated with the first and second carriers C1 and C2 (e.g. channel number, absolute radio frequency channel number, ARFCN, E-UTRA absolute radio frequency channel number EARFCN, etc); and an indication of no association between the first and second carriers, or an indication of no common deployment mode of the first and second carrier C2. The information may further comprise indications that the first carrier is configured as an anchor carrier and that the second carrier C2 is configured as a non-anchor carrier.

The association or deployment mode used for operating C1 and C2 is independent to the synchronization level between C1 and C2. For example, the carriers C1 and C2 may or may not be synchronized with respect to each other regardless of their association or common deployment mode. This is explained with a few examples below:

For example even if C1 and C2 are operated by co-located base stations, their frame timings may be different. The carriers C1 and C2 may assumed to be synchronized provided that their frame timings are within certain threshold (e.g. 3 μs), otherwise they are assumed to be unsynchronized (also known as asynchronous).

In another example assume that C1 and C2 are operated by non co-located network nodes. In this case the transmit timings of frames of C1 and C2 may be the same or can be within certain margin (e.g. 3 μs).

In yet another example assume that C1 and C2 are operated by non co-located network nodes. In this case the time difference of signals received at the wireless terminal from C1 and C2 may be within a certain margin (e.g. 10 μs). This is an example of synchronized operation with respect to the UE. However, C1 and C2 are operated by non co-located base stations.

Therefore the network node may further determine association between C1 and C2 based on one or more additional parameters or criteria i.e. in addition to the co-location of the network nodes operating C1 and C2 (step 208). Examples of such criteria are:

Carrier frequency of C2 e.g. select C2 which is below 2 GHz.

Frequency band of C2 e.g. select C2 which belongs to a frequency band below 2 GHz.

Relation between carrier frequencies of C1 and C2 e.g. select C2 provided the difference between C1 and C2 is not larger than certain frequency threshold (e.g. 20 MHz).

Timing of C1 and C2 or relation between their timings. Examples of timing relation is difference between the transmit timings of C1 and C2 (aka time alignment error (TAE) between transmit timings of C1 and C2), time difference between frame timings of C1 and C2 etc. For example C2 is selected, such that the frame timings of C1 and C2 are within certain threshold (e.g. 3 μs). In this case C1 and C2 may be termed as synchronized carriers.

The above rules or procedures may be applicable to any operational mode or one or more particular operation modes. Examples of modes are in-band, guard band and standalone modes.

If the required further conditions are not satisfied, the method may again end, or proceed to step 206 as above.

If no further conditions are required, or the required conditions are satisfied, the method proceeds to step 210 in which configuration information is transmitted to the wireless terminal to indicate an association between the first and second carriers, or to indicate a common deployment mode of the two carriers, i.e. that the two carriers are operated by the same network node or by co-located network nodes, and that the wireless terminal may use measurements for one carrier in order to transmit signals on the other carrier (see FIG. 2). As with step 206, the configuration information may be transmitted in one or more than one message. The configuration information may be transmitted using RRC signalling or other protocols. The configuration information may be broadcast (e.g. as part of a system information block), or dedicated to the wireless terminal (e.g. unicast or multicast). The configuration information may comprise one or more of: an indication of the carrier frequency associated with the first and second carriers C1 and C2 (e.g. channel number, absolute radio frequency channel number, ARFCN, E-UTRA absolute radio frequency channel number EARFCN, etc); and an indication of an association between the first and second carriers, or an indication of a common deployment mode of the first and second carrier C2. The information may further comprise indications that the first carrier is configured as an anchor carrier and that the second carrier C2 is configured as a non-anchor carrier.

In an alternative embodiment, the network node may transmit configuration information if the carriers C1 and C2 are operated by non co-located network nodes (i.e. as in step 206), but may not transmit configuration information if the carriers C1 and C2 are operated by the same network node or by co-located network nodes. That is, in this alternative embodiment, a wireless terminal may assume that carriers are operated by the same network node or co-located network nodes unless and until it receives configuration information to the contrary (i.e. in step 206). Thus, in this embodiment, step 210 is not carried out.

Figure 4:
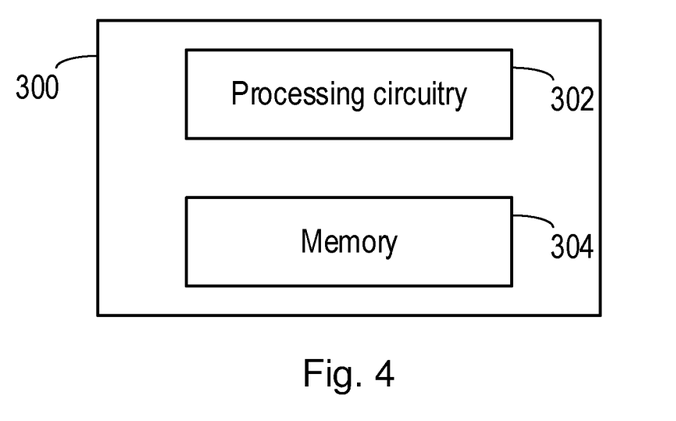
FIG. 4 is a schematic diagram of a wireless terminal device according to embodiments of the disclosure.

FIG. 4 is a schematic diagram of a wireless terminal device 300 according to embodiments of the disclosure. For example, the wireless terminal device 300 may correspond to the wireless terminal 16 described above. The device may be suitable for performing the method described above with respect to FIG. 2.

The wireless terminal device 300 may be configurable with a plurality of carriers for communication with one or more network nodes of a wireless network. The plurality of carriers may comprise a first carrier operated by a first network node of the wireless network located at a first cell site.

The wireless terminal device 300 comprises processing circuitry 302 and a non-transitory machine-readable medium 304 storing instructions which, when executed by the processing circuitry 302, cause the terminal device 300 to: responsive to a determination that a second carrier of the plurality of carriers is operated by the first network node or a second network node of the wireless network that is located at the first cell site: obtain one or more measured values for one or more radio characteristics for the first carrier; and utilize the one or more measured values to transmit a wireless radio message over the second carrier.

The wireless terminal device may also generally comprise hardware and/or software for transmitting and receiving wireless signals, such as one or more antennas, and transceiver circuitry coupled to the one or more antennas.

Figure 5:
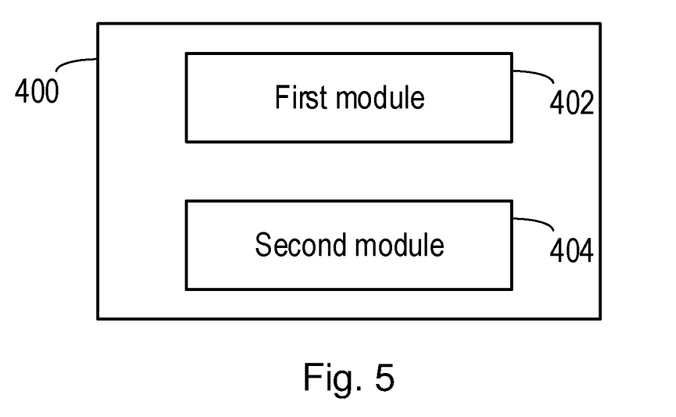
FIG. 5 is a schematic diagram of a wireless terminal device according to further embodiments of the disclosure.

FIG. 5 is a schematic diagram of a wireless terminal device 400 according to embodiments of the disclosure. For example, the wireless terminal device 400 may correspond to the wireless terminal 16 described above. The device may be suitable for performing the method described above with respect to FIG. 2.

The wireless terminal device 300 may be configurable with a plurality of carriers for communication with one or more network nodes of a wireless network. The plurality of carriers may comprise a first carrier operated by a first network node of the wireless network located at a first cell site.

The wireless terminal device 400 comprises a first module 402 configured to, responsive to a determination that a second carrier of the plurality of carriers is operated by the first network node or a second network node of the wireless network that is located at the first cell site, obtain one or more measured values for one or more radio characteristics for the first carrier. The wireless terminal device 400 further comprises a second module 404 configured to utilize the one or more measured values to transmit a wireless radio message over the second carrier.

The wireless terminal device may also generally comprise one or more modules for transmitting and receiving wireless signals, such as one or more antennas, and one or more transceiver modules coupled to the one or more antennas.

Figure 6:
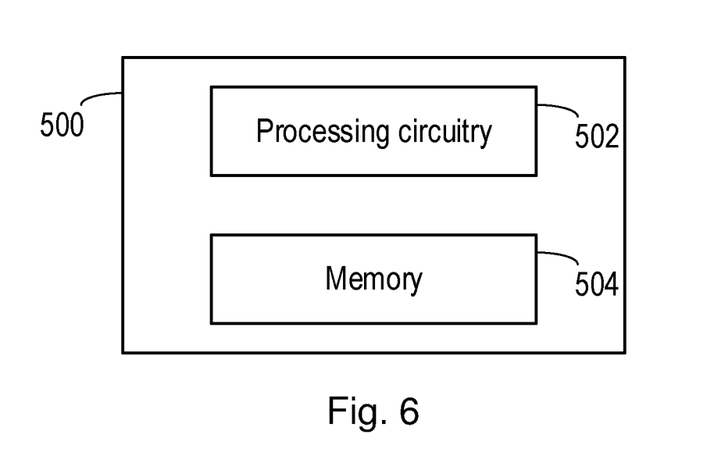
FIG. 6 is a schematic diagram of a network node according to embodiments of the disclosure.

FIG. 6 is a schematic diagram of a network node 500 according to embodiments of the disclosure. For example, the network node 500 may be a radio access node (such as an eNodeB or a gNodeB), or a node connected to the core network or within a server environment and communicatively coupled to such a radio access node.

The node 500 may be operable as one of the radio access nodes 12 described above with respect to FIG. 1. The node 500 may be suitable for performing the method described above with respect to FIG. 3.

The network node 500 may be in communication with a wireless terminal device which is configurable with a plurality of carriers for communication with a wireless network, the plurality of carriers comprising a first carrier, operated by a first network node located at a first cell site, and a second carrier.

The network node 500 comprises processing circuitry 502 and a non-transitory computer-readable medium 504 storing instructions which, when executed by the processing circuitry 502, cause the node 500 to transmit, to the wireless terminal device, configuration information indicating that the second carrier is operated by the first network node or by a second network node that is located at the first cell site.

The network node 500 may also generally comprise hardware and/or software for transmitting and receiving wireless signals, such as one or more antennas, and transceiver circuitry coupled to the one or more antennas.

Figure 7:
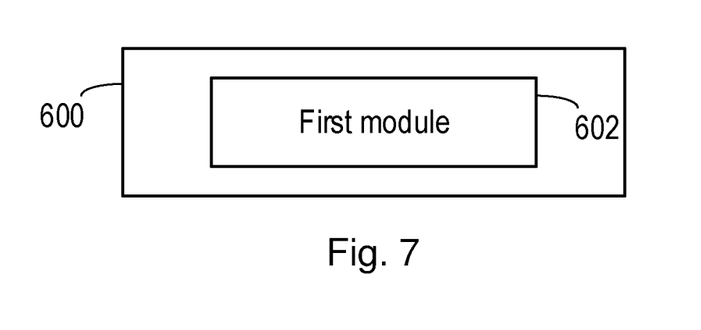
FIG. 7 is a schematic diagram of a network node according to further embodiments of the disclosure.

FIG. 7 is a schematic diagram of a network node 600 according to further embodiments of the disclosure. For example, the network node 600 may be a radio access node (such as an eNodeB or a gNodeB), or a node connected to the core network or within a server environment and communicatively coupled to such a radio access node.

The node 600 may be operable as one of the radio access nodes 12 described above with respect to FIG. 1. The node 600 may be suitable for performing the method described above with respect to FIG. 3.

The network node 600 may be in communication with a wireless terminal device which is configurable with a plurality of carriers for communication with a wireless network, the plurality of carriers comprising a first carrier, operated by a first network node located at a first cell site, and a second carrier.

The network node 600 comprises a first module 602 configured to to transmit, to the wireless terminal device, configuration information indicating that the second carrier is operated by the first network node or by a second network node that is located at the first cell site.

The network node 600 may also generally comprise one or more modules for transmitting and receiving wireless signals, such as one or more antennas, and one or more transceiver modules coupled to the one or more antennas.

Thus embodiments of the disclosure provide methods and apparatus that allow a wireless terminal to utilize measurements on one carrier (e.g. an anchor carrier) to transmit messages on another carrier (e.g. a non-anchor carrier) provided that the carriers are operated by the same network node, or by co-located network nodes. Methods and apparatus are also provided that allow an association between two or more carriers, that are operated by the same network node or by co-located nodes, to be signaled to a wireless terminal.

The invention claimed is:

1. A method in a wireless terminal device, the wireless terminal device being configurable with a plurality of carriers for communication with one or more network nodes of a wireless network, the plurality of carriers comprising a first carrier operated by a first network node of the wireless network located at a first cell site, the method comprising:
responsive to a determination that a second carrier of the plurality of carriers is operated by the first network node or a second network node of the wireless network that is located at the first cell site:
obtaining one or more measured values for one or more radio characteristics for the first carrier;
utilizing the one or more measured values to determine radio resources for transmission of a wireless radio message over the second carrier; and
transmitting the wireless radio message over the second carrier using the determined radio resources; and
wherein utilizing the one or more measured values to determine the radio resources for transmission of the wireless radio message over the second carrier based on the one or more measured values comprises:
determining a coverage level for the second carrier based on the one or more measured values; and
determining the radio resources for transmission of the wireless radio message over the second carrier, based on the coverage level.

2. The method according to claim 1, wherein the first carrier is an anchor carrier, and the second carrier is a non-anchor carrier.

3. The method according to claim 1, wherein obtaining the one or more measured values comprises performing measurements on the first carrier in order to obtain the one or more measured values for the one or more radio characteristics.

4. The method according to claim 1, wherein the one or more radio characteristics comprise one or both of: signal strength and signal quality.

5. The method according to claim 1, wherein determining the coverage level for the second carrier comprises mapping the one or more measured values to one of a plurality of discrete values for the coverage level for the second carrier.

6. The method according to claim 1, wherein determining the coverage level comprises:
determining a path loss between the wireless terminal device and the first network node based on the one or more measured values; and
determining the coverage level for the second carrier based on the determined path loss.

7. The method according to claim 1, wherein the determined radio resources are resources for transmission of a random access preamble on the second carrier.

8. The method according to claim 1, wherein, with respect to determining that the second carrier is operated by the first network node or a second network node that is located at the first cell site, the wireless terminal device assumes that the second carrier is operated by the first network node or a second network node that is located at the first cell site, based on an operational mode of the wireless terminal device.

9. A method in a wireless terminal device, the wireless terminal device being configurable with a plurality of carriers for communication with one or more network nodes of a wireless network, the plurality of carriers comprising a first carrier operated by a first network node of the wireless network located at a first cell site, the method comprising:
responsive to a determination that a second carrier of the plurality of carriers is operated by the first network node or a second network node of the wireless network that is located at the first cell site:
obtaining one or more measured values for one or more radio characteristics for the first carrier;
utilizing the one or more measured values to determine radio resources for transmission of a wireless radio message over the second carrier; and
transmitting the wireless radio message over the second carrier using the determined radio resources; and
wherein the method further comprises determining whether the second carrier is operated by the first network node or a second network node that is located at the first cell site based on at least one of:
determining whether respective distances determined by the wireless terminal device for the first and second carriers are within a threshold distance difference, or determining whether respective path losses determined by the wireless terminal device for the first and second carriers are within a threshold pathloss difference.

10. A method in a wireless terminal device, the wireless terminal device being configurable with a plurality of carriers for communication with one or more network nodes of a wireless network, the plurality of carriers comprising a first carrier operated by a first network node of the wireless network located at a first cell site, the method comprising:
responsive to a determination that a second carrier of the plurality of carriers is operated by the first network node or a second network node of the wireless network that is located at the first cell site:
obtaining one or more measured values for one or more radio characteristics for the first carrier;
utilizing the one or more measured values to determine radio resources for transmission of a wireless radio message over the second carrier; and
transmitting the wireless radio message over the second carrier using the determined radio resources; and
wherein the method further comprises performing the step of utilizing the one or more measured values to determine the radio resources for transmission of the radio message over the second carrier only if one or more conditions are satisfied, and otherwise using measurements made on the second carrier to determine the radio resources for transmission of the radio message over the second carrier, and wherein the one or more conditions comprise at least one of:
the second carrier has a carrier frequency below a frequency threshold;

a frequency difference between a carrier frequency of the second carrier and a carrier frequency of the first carrier is less than a threshold amount; and a frame timing in the second carrier is offset with respect to a frame timing in the first carrier by less than a threshold amount.

11. A wireless terminal device, the wireless terminal device being configurable with a plurality of carriers for communication with one or more network nodes of a wireless network, the plurality of carriers comprising a first carrier operated by a first network node of the wireless network located at a first cell site, the wireless terminal device comprising:

processing circuitry; and a non-transitory machine-readable medium storing code that, when executed by the processing circuitry, causes the wireless terminal device to, responsive to a determination that a second carrier of the plurality of carriers is operated by the first network node or a second network node of the wireless network that is located at the first cell site:

obtain one or more measured values for one or more radio characteristics for the first carrier;

utilize the one or more measured values to determine radio resources for transmission of a wireless radio message over the second carrier; and;

transmit the wireless radio message over the second carrier using the determined radio resources; and wherein the non-transitory machine-readable medium further stores code that, when executed by the processing circuitry, causes the wireless terminal to:

determine a coverage level for the second carrier based on the one or more measured values, and determine the radio resources to transmit the wireless radio message over the second carrier based on the coverage level.

12. The wireless terminal device according to claim 11, wherein the first carrier is an anchor carrier, and the second carrier is a non-anchor carrier.

13. The wireless terminal device according to claim 11, wherein the wireless terminal device is configured to obtain one or more measured values by performing measurements on the first carrier in order to obtain the one or more measured values for the one or more radio characteristics.

14. The wireless terminal device according to claim 11, wherein the determined radio resources are used for transmission of a random access preamble over the second carrier by the wireless terminal device.

15. A wireless terminal device, the wireless terminal device being configurable with a plurality of carriers for communication with one or more network nodes of a wireless network, the plurality of carriers comprising a first carrier operated by a first network node of the wireless network located at a first cell site, the wireless terminal device comprising:

processing circuitry; and a non-transitory machine-readable medium storing code that, when executed by the processing circuitry, causes the wireless terminal device to, responsive to a determination that a second carrier of the plurality of carriers is operated by the first network node or a second network node of the wireless network that is located at the first cell site:

obtain one or more measured values for one or more radio characteristics for the first carrier;

utilize the one or more measured values to determine radio resources for transmission of a wireless radio message over the second carrier; and;

transmit the wireless radio message over the second carrier using the determined radio resources; and wherein the non-transitory machine-readable medium further stores code that, when executed by the processing circuitry, causes the wireless terminal device to:

determine whether the second carrier is operated by the first network node or a second network node that is located at the first cell site based on at least one of:

determining whether respective distances determined by the wireless terminal device for the first and second carriers are within a threshold distance difference, or determining whether respective path losses determined by the wireless terminal device for the first and second carriers are within a threshold pathloss difference.

* * * * *